May 3, 1927.
H. R. STUART
1,627,125
DEMONSTRATING DEVICE FOR SHOCK ABSORBERS AND THE LIKE
Filed Aug. 19, 1924
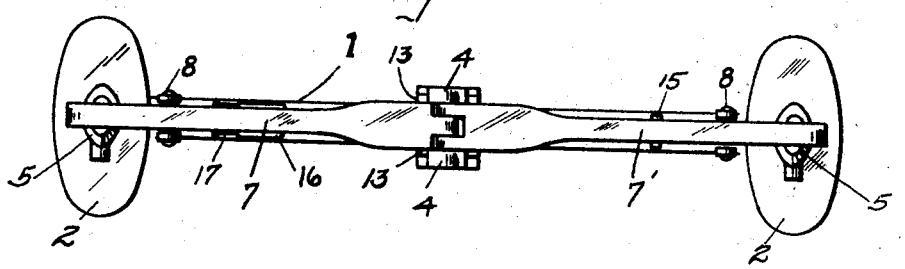
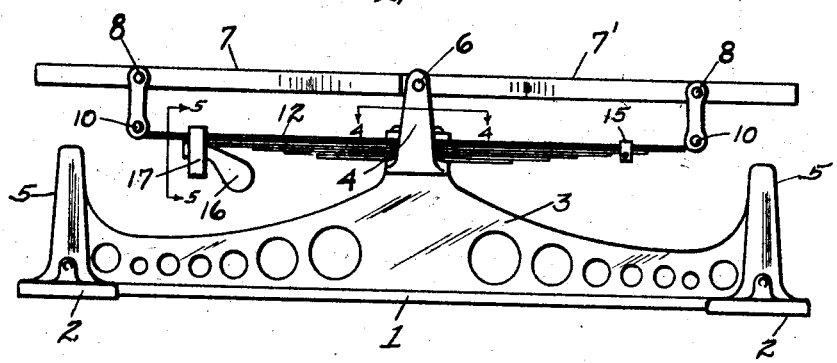
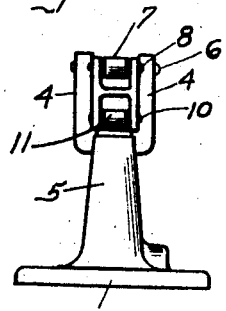
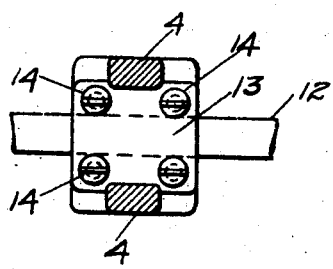
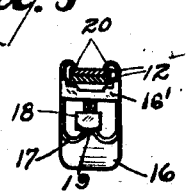
Inventor
Harry R. Stuart
By Staley Burman
Attorneys Patented May 3, 1927.

1,627,125

UNITED STATES PATENT OFFICE.

HARVE R. STUART, OF SPRINGFIELD, OHIO, ASSIGNOR TO THE BAUER-STUART COMPANY, OF SPRINGFIELD, OHIO, A CORPORATION OF OHIO.

DEMONSTRATING DEVICE FOR SHOCK ABSORBERS AND THE LIKE.

Application filed August 19, 1924. Serial No. 733,009.

My invention relates to a demonstrating device for shock absorbers for motor vehicles.

The object of my invention is to provide a simple and effective device embodying parts in miniature corresponding to portions of a motor vehicle, which will demonstrate the merits of a shock absorber for such vehicles.

In the accompanying drawings:

Fig. 1 is a top plan view.

Fig. 2 is a side elevation.

Fig. 3 is an end view.

Fig. 4 is a section on the line 4—4 of Fig. 2.

Fig. 5 is an end view of the shock absorbing device showing the spring in section.

Referring to the drawings, 1 represents a supporting base having feet 2 so that the base and its supported parts may be set upon a table or other suitable support. The base 1 has an integrally-formed web 3, the central portion of which has an upwardly projecting integrally-formed yoke 4. Projecting vertically from the ends of the base and integrally formed therewith and with the web are posts 5. Pivotally mounted upon a pin 6 carried by the upper ends of the yoke members 4 are oppositely-extending levers 7 and 7', the ends of the levers projecting over the posts 5 which act as stops for the levers in a manner to be explained. Each one of these levers represent in miniature a portion of the frame of a motor vehicle, there being two frame parts, each independent of the other. Pivotally connected to each lever by a pin 8 is a shackle 9 and pivotally connected with the pin 10 of each shackle is an eye 11 of the upper leaf of a spring 12 which consists of a plurality of leaves as is common with motor vehicle springs. The central portion of the spring is clamped to the base of the yoke by the plate 13 and screws 14.

One end of the spring is shown equipped with an ordinary clip 15 and the other end of the spring shown equipped with a stabilizer or shock absorber constructed in the present case on the principle set forth in my pending application Ser. No. 733,008, filed Aug. 19, 1924, in which 16 represents a weighted arm which is clamped to at least two of the leaves of the spring by a U-shaped strap 17 of resilient metal, the head 16' of the weight carrying a screw, the head 18 of which engages a bent-in rib 19 on the cross portion of the strap to clamp the weight to the spring; the upper ends of the side portions of the strap being inturned as indicated at 20 to engage the upper leaf of the spring. While I have shown this particular form of shock absorber or stabilizer it will be understood that the device is equally applicable to demonstrate the merits of other shock absorbers or stabilizers.

The operation is as follows: The base and its web correspond to the axle of the vehicle and the levers 7 and 7' to the frame of the vehicle. To demonstrate, the lever 7' is pressed down until stopped by the post 5 and then suddenly released so as to be projected upwardly by the spring. It will be found that the lever has imparted thereto a series of pronounced and long continuous vibrations under the action of the spring and will be projected upwardly beyond its normal position, shown in Fig. 2, thus indicating the action which takes place under shock with a spring the vibrations of which are not dampened or absorbed by a shock absorber or stabilizer. If, now, the lever 7 is operated in a similar manner it will be found that this lever comes to rest in its normal position without material vibration and without being projected upwardly to a material extent beyond its normal position shown in Fig. 2, the vibrations imparted thereto being much dampened and lasting but a short time, thus demonstrating the effectiveness of the shock absorber or stabilizer applied to that end of the spring in absorbing or dampening the vibrations of the spring and preventing rebound.

All of the parts of the device are in miniature so as to make a light and compact demonstrator which can be easily carried from place to place and set on a desk or table for manipulation.

Having thus described my invention, I claim:

1. In a demonstrating device of the character described, parts representing an axle, a pair of duplicate movable frame members each independent of the other, and a supporting spring, one frame member being connected with one end of said spring, and the other frame member connected with the other end of said spring, and a shock absorbing device between the axle and one only of said frame members.

2. In a demonstrating device of the character described, parts representing an axle, a pair of movable frame members each independent of the other, and a supporting spring centrally supported on said axle, one frame member being connected with one end of said spring and the other frame member with the other end of said spring, and a shock absorbing device on one end of said spring.

3. In a demonstrating device of the character described, parts representing an axle, a pair of frame members and a supporting spring, said spring being centrally supported by said axle, said frame members being pivotally connected with said axle and projecting in opposite directions in parallel relation with said spring and beyond the same, a shackle connecting each of said frame members with an end of said spring, and a shock absorbing device on one end of said spring.

4. In a demonstrating device of the character described, a support, a spring having its central portion clamped to said support, a pair of levers pivotally connected with said support above said spring and projecting in opposite directions in parallel relation with said spring, shackles for connecting the free ends of said levers with the respective ends of said spring, and a shock absorbing device secured to one end of said spring.

5. In a demonstrating device of the character described, parts representing an axle, a pair of frame members and a supporting spring; said axle member consisting of a base, a longitudinally-disposed web, a yoke projecting upwardly from the central portion of said web, and end posts; said spring being clamped to said web between said yoke, said frame members being pivotally connected with said yoke and projecting in opposite directions in parallel relation with said spring with their ends projecting in line with said posts, means for pivotally connecting each of said frame members with an end of said spring, and a shock absorbing device connected with one end of said spring.

6. In a demonstrating device of the character described, parts representing in miniature an axle, a pair of duplicate frame members independently movable, and a supporting spring centrally mounted, means for connecting one frame member to one end of said spring and the other frame member to the opposite end of said spring, and a shock absorbing device directly connected and entirely supported by one end of said spring between the axle and one only of said frame members.

7. In a demonstrating device of the character described, a supporting base member formed with a flat bottom so as to be set upon a table or other support and representing in miniature an axle, and a miniature spring member connected with said supporting base and projecting in opposite directions from the point of connection, in combination with a shock absorbing device connected with said spring member on one side only of said point of connection and solely supported by said spring member.

In testimony whereof, I have hereunto set my hand this 22nd day of July 1924.

HARVE R. STUART.